United States Patent
Haase

[11] Patent Number: 5,961,913
[45] Date of Patent: Oct. 5, 1999

[54] DEVICE AND PROCESS FOR VULCANIZING TIRES

[75] Inventor: Ralf Haase, Vienna, Austria

[73] Assignee: Semperit Reifen Aktiengesellschaft, Traiskirchen, Austria

[21] Appl. No.: 08/863,953

[22] Filed: May 27, 1997

[30] Foreign Application Priority Data

May 28, 1996 [AT] Austria ..................................... 925/96

[51] Int. Cl.⁶ ................................................. B29C 35/00
[52] U.S. Cl. ............................... 264/326; 425/36; 425/38
[58] Field of Search .................................. 264/315, 326; 425/36, 38, 39, 47

[56] References Cited

U.S. PATENT DOCUMENTS

| | | | |
|---|---|---|---|
| 3,184,794 | 5/1965 | Sherkin | 425/36 |
| 3,277,532 | 10/1966 | Hutchinson | 425/36 |
| 3,443,280 | 5/1969 | Hugger | 425/36 |
| 3,917,791 | 11/1975 | Kratochvil et al. | |
| 3,948,591 | 4/1976 | Kratochvil et al. | |
| 4,181,483 | 1/1980 | Pech et al. | |
| 5,127,811 | 7/1992 | Trethowan | |
| 5,405,568 | 4/1995 | Dernbach | 425/38 |

FOREIGN PATENT DOCUMENTS

| | | |
|---|---|---|
| 325442 | 12/1974 | Austria. |
| 061850 | 10/1982 | European Pat. Off.. |
| 0368546 | 5/1990 | European Pat. Off.. |
| 0729825 | 9/1996 | European Pat. Off.. |
| 1587458 | 3/1970 | France. |
| 1219669 | 6/1966 | Germany. |
| 1229713 | 12/1966 | Germany. |
| 1729864 | 7/1971 | Germany. |
| 2201080 | 11/1972 | Germany. |
| 2228504 | 12/1972 | Germany. |
| 2303853 | 8/1973 | Germany. |
| 4434270 | 3/1996 | Germany. |
| 864 443 | 4/1961 | United Kingdom ............... 425/36 |
| 1231597 | 5/1971 | United Kingdom. |

*Primary Examiner*—Mathieu D. Vargot
*Attorney, Agent, or Firm*—Greenblum & Bernstein, P.L.C.

[57] ABSTRACT

A process for vulcanizing tires in an automatically actuatable curing press, which has a vulcanization mold of two or more parts that can be opened and closed and has bead rings for positioning and shaping the tire beads, wherein the bead rings can be moved via actuation mechanisms in the axial direction with regard to the tire position in the curing press. A loading device takes the tire to be vulcanized and positions the tire on the lower bead ring. The press/mold/tire system is sealed inside the bead rings by the curing mold and/or the press and is sealed outside the bead rings by the tire. The automatically actuatable curing press, which is for vehicle tires, has a vulcanization mold of two or more parts that can be opened and closed, and has mold segments, side shells, and bead rings for positioning and shaping the tire beads of the tire. A loading device is provided for taking the tire to be vulcanized and positioning it on the lower bead ring. The press/mold/tire system is sealed inside the bead rings by the curing mold and/or the press and is sealed outside the bead rings by the tire. At least the lower bead ring can be moved independently of the side shells of the mold.

19 Claims, 10 Drawing Sheets

DEVICE AND PROCESS FOR VULCANIZING TIRES

CROSS-REFERENCE OF RELATED APPLICATIONS

The present invention claims the priority under 35 U.S.C. § 119 of Austrian Patent Application No. 925/96, filed May 28, 1996, the disclosure of which is expressly incorporated by reference herein in its entirety.

BACKGROUND OF THE INVENTION

1. Field of the Invention

The current invention relates to a process and device for vulcanizing tires.

2. Discussion of Background Information

In general, the standard process for vulcanizing tires, in particular green tires, independently of the type of curing press used, is carried out by means of an expandable bladder, which preshapes the tire to be vulcanized and presses it against the curing mold.

The bladder fulfills a series of functions, namely centering the blank as long as the mold is not closed, separating the heating medium from the blank, shaping the bead toes and the inner-liner of the tire, and sealing the system in relation to the outside.

It has been known for a long time that the process of bladder vulcanization is involves a number of disadvantages. The inflated outline of the bladder deviates sharply from the contour of the blank, particularly in the region of the shoulder of the tire. As a result, relatively large air pockets are produced between the bladder and tire, which have to be eliminated during the molding process. For this reason, air removal grooves are provided on the outside of the bladder. However, these air removal grooves admit inner plate material of the tire and as a result, diminish the layer thickness.

Furthermore, the bladder comes to rest in the blank, in the crown and bead regions first and in the shoulder regions of the tire last. As a result, an air transport takes place inside the blank along the belt cord strands toward the belt edges. The air collected there must be absorbed by the shoulder components and weakens the vulcanization capacity in the milling zone region. Due to a smoothing effect during the shaping of the inner-liner, tire material is transported in the direction of all component impacts, which can lead, for example, to displacements of the fiber distribution in the casing. This can lead to bumps and indentations in the side wall of the finished, pumped tire.

Since in general, one bladder is used for several tire dimensions, this can also cause air removal problems between the bladder and green tire.

The quality of the finished tire that has been cured with bladders can be impaired because bladders are used which inflate more on one side and consequently de-center the tire in the press, and furthermore, because bladder defects, for example holes, can appear during vulcanization.

After press shutdowns, the bladder must be manually preshaped before reloading, which frequently leads to quality problems when starting up, due to the lack of an automatic time/temperature process.

In addition, because of its wall thickness, the bladder restricts the heat flux between the heating medium and the tire, which adds to the costs of curing time and energy balancing.

Furthermore, the bladder requires an internal treatment of the green tire, for example the injection with silicon-containing solution that is either benzenous or aqueous. This solution hampers welding on all tire components on the inside and is also damaging to the environment.

In addition, the bladder manufacturing and bladder disposal costs represent a considerable economic factor.

The structural optimization of tires is carried out by means of assessing radial and circumference sections and micro-sections of the vulcanized tire. This constitutes a two dimensional assessment method. Structural material distribution weaknesses which come to light in a three dimensional fashion on the inside of the tire as a result of a pressure of the medium that acts equally in all directions, are smoothed by the bladder and can no longer be detected. The result can be hidden weak points or welding weaknesses or quality-impairing material displacements in the internal component structure of the tire, which are only possible to see, if at all, as bubbles or creases from the shifting of material.

Various devices have already been proposed for the bladderless vulcanization of green tires. A device of this kind has been disclosed, for example, by DE-A 2228504, in which a clamping device for the tire bead is provided in the tire mold and has a press device for the tire bead. Essentially, the inner chamber of the green tire is intended to be sealed through the use of press devices of this kind. A realization of systems of this kind has failed primarily because it is much too expensive to build and is susceptible to malfunction.

SUMMARY OF THE INVENTION

The invention now has the stated object of developing a process and a device for the bladderless vulcanization of tires, which is suitable for both the vulcanization of green tires for passenger cars and trucks of the radial or bias type and of all types of reconditioned car or truck tires, and for the vulcanization of those tires that are constructed in two separate parts of the process, for example in accordance with the process disclosed by EP-A 0 729 825, and in this instance, both for the vulcanization of the partial tire constructed in the first part of the process and the vulcanization of the tire completed in the second part of the process. The process should be able to be carried out at low cost via the adaptation of conventional tire presses, should function reliably, and should assure high-quality finished tires.

The stated object is attained according to the invention by virtue of the fact that the press/mold/tire system is sealed inside the bead rings by means of the curing mold and/or the press and is sealed outside the bead rings by means of the tire, that in the first phase of the closing of the curing press, the two bead rings are moved toward each other until either the inherent rigidity of the tire to be vulcanized exerts a recoiling force on the bead rings or the two bead rings touch each other, wherein tensing vapor is subsequently introduced into the sealed inner chamber of the press and tire, preferably in a stop position of the press closing process, by means of which the tire beads are pressed in a vapor-tight manner against the two bead rings, where in the end position of the bead rings, the closing process of the press is finished.

Therefore, the process according to the invention advantageously requires only, relatively few adaptation measures on conventional curing presses, in fact independently of their type. All of the above-mentioned disadvantages of the conventional vulcanization with bladders are eliminated. A detectable rationalization effect is connected to this, for example as a result of the elimination of the internal injection and the costs of bladder manufacture and handling, and also as a result of a detectable reduction in curing time. The tires cured in accordance with the process according to the invention are high in quality since the disadvantageous effects of the bladder heating, for example the aboved-noted smoothing effect and the results brought about by bladders that do not fit optimally and by defective bladders no longer occur. An essential aspect of the process according to the invention is that the tire seals against the bead rings over its bead regions and as a result of the introduction of tensing vapor.

In an embodiment of the invention, the lower bead ring is brought into a raised position before the introduction of the tire to be vulcanized.

According to another feature of the invention, the tensing vapor is regulated in such a way that the force acting in a downward direction on the lower bead ring is slightly greater than the lifting force exerted via the actuation mechanism of the lower bead ring so that the lower bead ring reaches its end position in the bottom side shell (wall).

The tensing vapor is introduced with an overpressure of 0.4 to 1.8 bar, in particular 0.8 to 1.5 bar.

In an embodiment of the invention, the process runs in such a way that in the first phase of the closing of the curing press, both bead rings are moved reciprocally toward each other, wherein the upper bead ring can also be moved independently of the side shell.

In this instance, the mold actuation is assumed by the container itself, which is possible in a structurally simple manner by virtue of the fact that segment hooks, which are attached to the container segments, engage in the lower container plate in order to stabilize the upper side shell of the mold during the closing and opening process.

The control of the course of motion of the lowering of the lower bead ring and if need be, the upper bead ring, can be carried out in a particularly simple manner via controllable overflow valves.

The process according to the invention is particularly effective because the closing of the container and the mold segments can occur in a manner that is known per se and also by virtue of the fact that the build-up of closing pressure and the introduction of the heating medium can also be carried out in a manner that is known per se.

In order to prevent thermal damage to tire components, it is good if the temperature guidance of the heating medium and the temperature load capacity of the components of the tire to be vulcanized are tuned to each other. This can take place via the heating medium itself or also via the mixture composition and corresponding choice of the raw materials to be used in the tire.

The removal of the residual water at the end of the curing cycle can be carried out in a very simple manner. To that end, for example at the end of the curing cycle, a stream of vapor or air can be introduced into the inside of the tire or it can be acted upon by vacuum.

Alternatively, the condensate can also be continuously removed during the curing process by means of the internal pressure.

The invention furthermore relates to an automatically actuatable curing press for vehicle tires, which has a vulcanization mold comprised of two or more parts that can be opened and closed, and has mold segments, side shells, and bead rings for positioning and shaping the tire beads of the tire, wherein the bead rings can be moved via actuation mechanisms in the axial direction with regard to the tire position in the curing press, and wherein a loading device is provided for taking the tire to be vulcanized and positioning it on the lower bead ring.

In a curing press embodied according to the invention, the press/mold/tire system is sealed inside the bead rings by means of the curing mold and/or the press and is sealed outside the bead rings by means of the tire, wherein at least the lower bead ring can be moved independently of the side shell of the mold.

As mentioned above, a particular advantage of the curing press according to the invention is constituted in that it can be produced from conventional curing presses via relatively simple adaptation measures.

A part of these simple measures is that the bead rings are embodied as free of air removal bores in the toe region and are each equipped with an annular centering part for centering the tire.

If a curing press is at issue, in which an ejection tube that can move up and down in order to move the upper vulcanization mold parts and a ramming cylinder for actuating a cloverleaf mechanism are provided in the top part of the press, and a well that can be raised and lowered is provided in the lower part of the press, the sealing of the system occurs in the lower part of the press in a simple manner in such a way that the lower bead ring is fastened to the well and the system is sealed in relation to the outside by means of a seal, in particular a rubber seal.

The vertical guidance of the well is embodied in a simple manner by virtue of the fact that a centering ring is provided, which is preferably attached to the heating plate of the curing press.

In an embodiment of a curing press of this kind, it is also provided that the upper bead ring can be moved up and down jointly with the ejection tube and independently of the side shell of the mold.

The seal between the ejection tube and the upper bead ring can be achieved in a structurally simple manner if the upper bead ring is connected to a collared cylinder which is sealed on the one end in relation to the bead ring and on the other end in relation to the ejection tube, in particular with the interposition of a rubber seal. Also, the seal in the region of the ramming cylinder can be carried out in a very simple fashion. To that end, a sealing pack is disposed, for example, between the ejection tube and the ramming cylinder.

In this type of curing press, the upper bead ring can also be raised and lowered as already mentioned. A proper actuation of the container, in particular a potential lifting of the container segments from the container plates because of the internal pressure of the tire is therefore effectively prevented if segment hooks are attached to the container segments and are introduced into grooves provided on the lower container plate when the container mold is closed.

In another type of curing press—in which the actuation mechanism for the lower bead ring includes a central mechanism with a lower bladder clamping ring that can be raised and lowered and is sealed in relation to the outside by means of at least one seal, in particular a rubber seal—according to the invention, in lieu of the bladder, a seal is clamped between the bead ring and the lower bladder clamping ring, which assures the sealing of the system in this region of the curing press.

The seal can also advantageously be the cut-off base of a bladder.

To seal this type of curing press in the upper part of the press, according to another feature of the invention, it is furthermore provided that the upper bead ring is provided on a bead ring plate embodied in the form of a cover and is embodied as being of one piece with this plate or as being separate from it, wherein the bead ring plate or the bead ring is attached to the side shell and can be moved in concert with it. The measures to be taken with this type of curing press are therefore particularly simple.

Furthermore, the invention also relates to a tire which is vulcanized in accordance with the process according to the invention, or in a curing press according to the invention.

BRIEF DESCRIPTION OF THE DRAWINGS

Other features, advantages, and details of the invention will now be explained in detail in conjunction with the drawings, which depict a number of exemplary embodiments.

FIG. 4 shows the upper part of the curing press embodied according to the invention, FIG. 5 shows a detail of the embodiment in the region of the ejection tube, FIG. 6 shows the lower part of the curing press embodied according to the invention, FIG. 7 shows a detail of the embodiment in the region of the container, FIG. 8 shows the central mechanism, FIG. 9 shows the bladder clamp and the curing mold.

DETAILED DESCRIPTION OF THE PREFERRED EMBODIMENTS

The particulars shown herein are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 2:
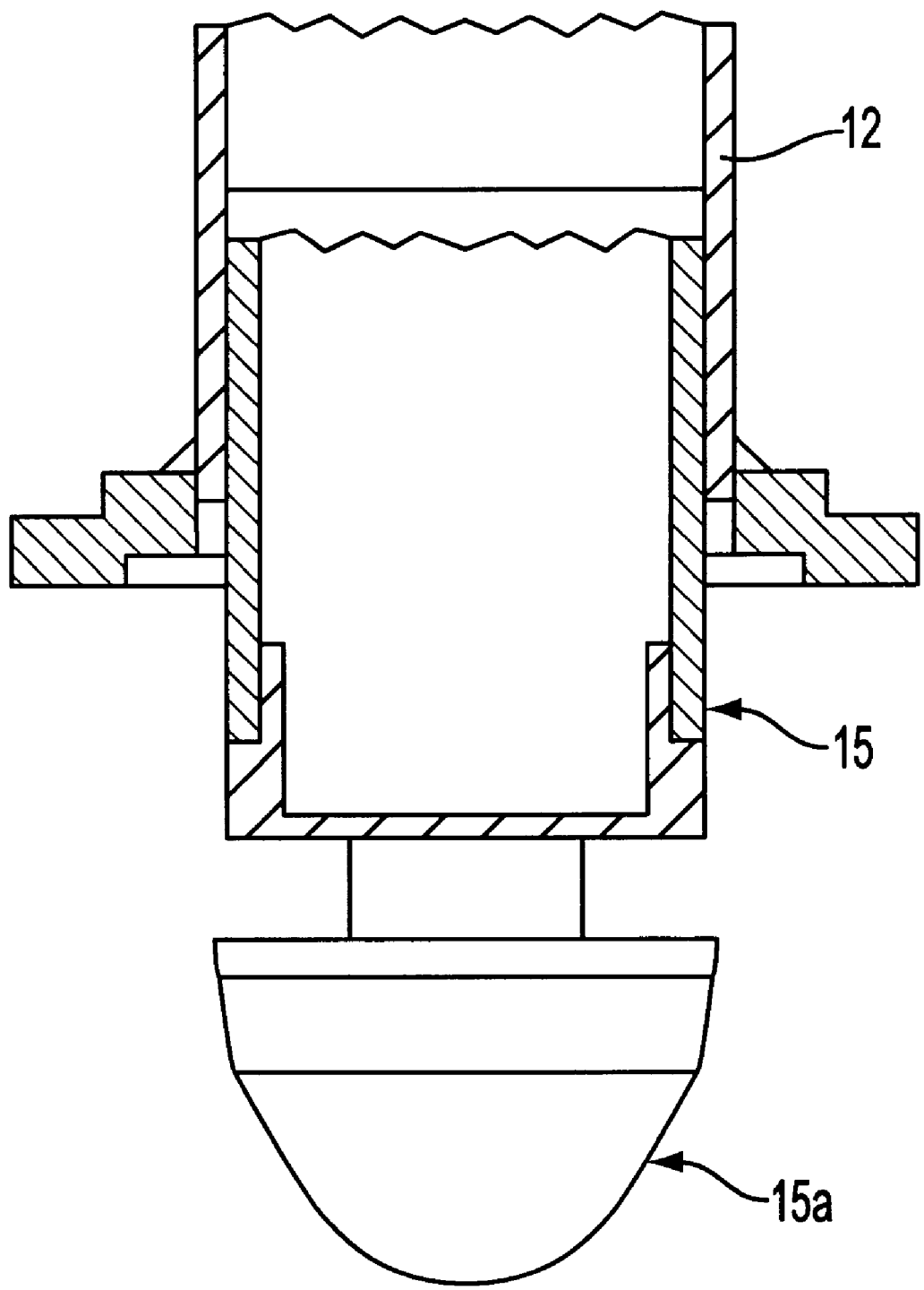
Figure 3:
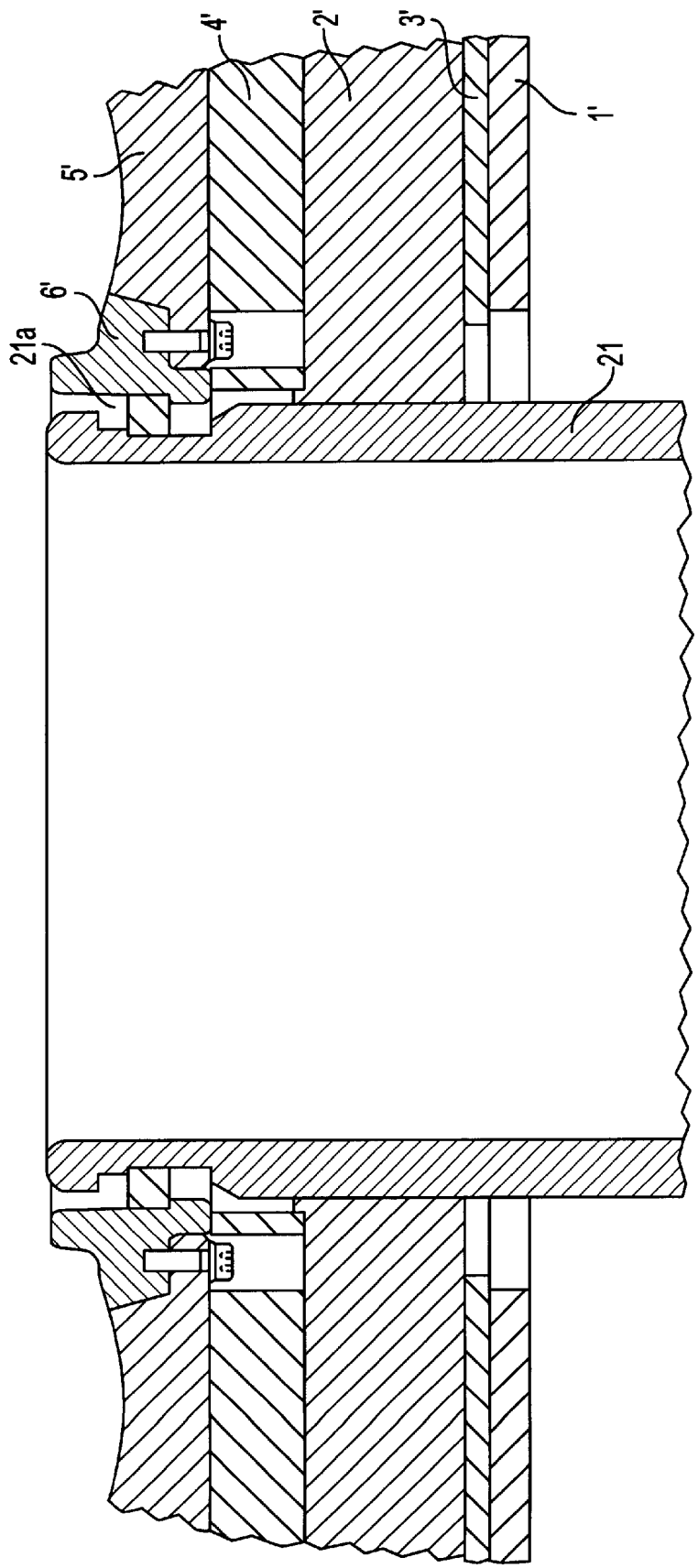

The sectional representations of the electrically driven auto-molding press according to the prior art show essential components of the upper part of the press (FIG. 1), the region of the ramming cylinder and the ejection tube (FIG. 2), and essential parts of the lower part of the press (FIG. 3).

Figure 1:
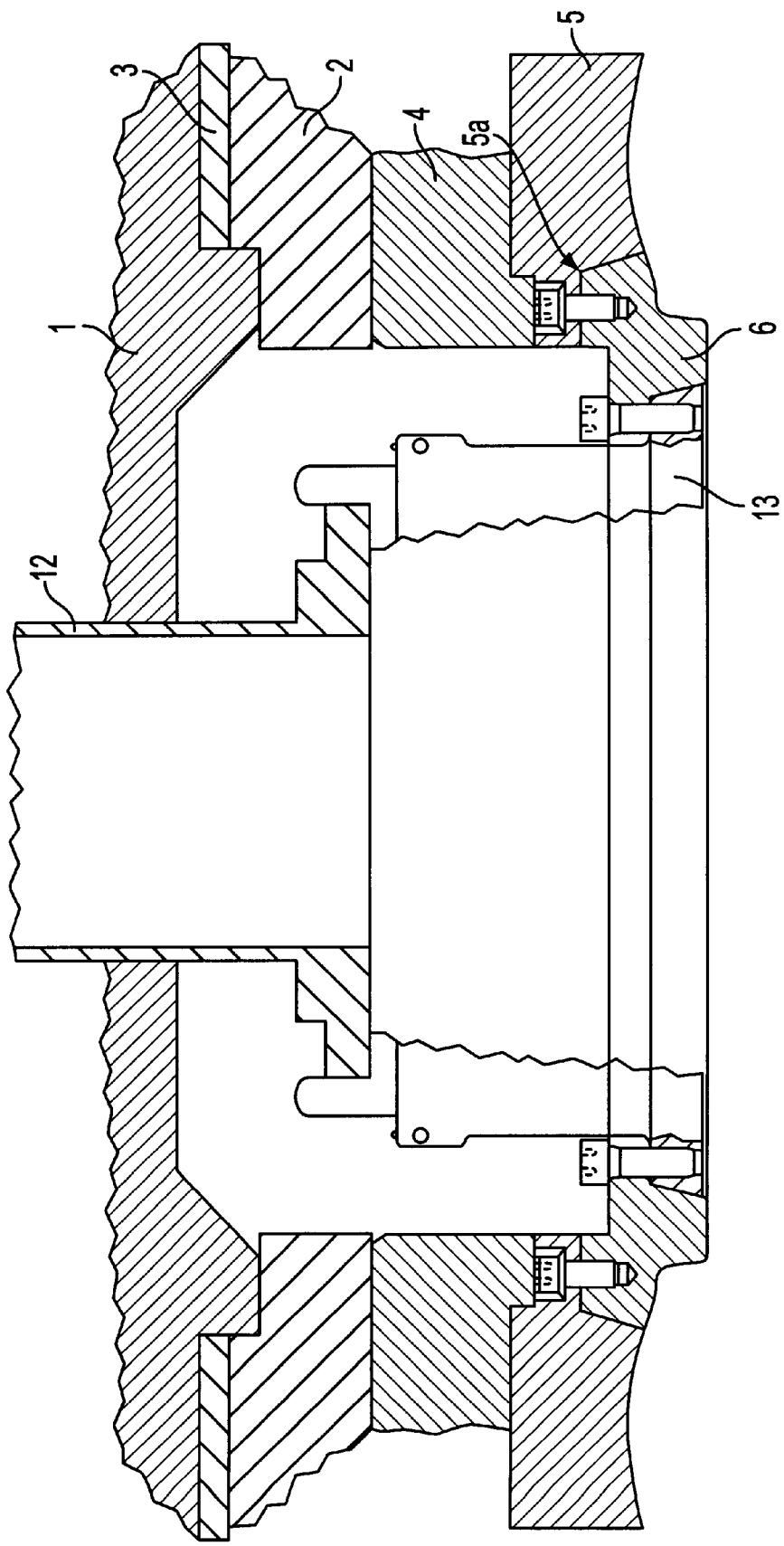
FIGS. 1 to 3 are sectional representations that cut through essential components of an electrically driven auto-molding press according to the prior art.

As shown in FIG. 1, the upper part of the curing press has an ejection tube 12, an upper receiving plate 1, a heating plate 2, an insulating plate 3 disposed between the heating plate 2 and the receiving plate 1, and a container plate 4 for receiving the side shell (wall) 5 of the segment mold. The upper bead ring 6 of the segment mold, which is screwed to the side shell 5 is disposed in a pan 5a of the side shell 5. The other parts of the curing mold, which is a conventional segment mold for radial tires and has a number of radially movable segments that form the profile, are not shown. A cloverleaf mechanism 13 is provided for removing the tire from the press. As shown in FIG. 2, a ramming cylinder 15, which is disposed in the ejection tube 12 and can be moved vertically in relation to the ejection tube 12, actuates the cloverleaf mechanism 13 (see FIG. 1) and centers the bladder, not shown, with its ball-shaped end 15a. The ramming cylinder 15 also fulfills the function of indenting the bladder.

Essential parts of the lower part of the press are shown in FIG. 3. These parts include a well 21, which is embodied in the form of a cylinder, is closed at the bottom, and is provided with inflow and outflow openings for the heating medium in a manner that is known per se, a press table plate 1', a lower heating plate 2', an insulation plate 3', which is disposed between the table plate 1' and the heating plate 2', a lower container plate 4', as well as the parts belonging to the segment mold, wherein the lower side shell (wall) 5' and a lower bead ring 6' are shown here. Screws attach the bead ring 6' is screwed to the lower side shell 5'. The bladder (not shown) is clamped in a recess 21a between the bead ring 6' and the well 21.

The conventional bladder curing process with a tire press of this kind runs in such a manner that a loader takes the raw tire or the tire to be vulcanized and positions it centrally and plane-parallel on the lower bead ring 6'. After the insertion of the bladder into the raw tire and exertion of vapor pressure for the purpose of generating a holding pressure, the loader releases the raw tire and the bladder takes over the centering of the raw tire. The press is moved into a position in which the upper bead ring 6 lightly touches the raw tire bead. Now a pressure increase is carried out in the bladder (preshaping pressure) so that the air disposed between the bladder and the tire is driven out in the direction of the bead regions via the bladder grooves provided on the outside of the bladder. As the press closes further, the bladder volume decreases because a ball-shaped mold brings the bladder into a toroid shape that corresponds to a tire. Either the pressure in the bladder is increased, which puts strain on the tire cords, or the tensing vapor flows via an orifice at an approximately constant pressure, which spends unnecessary energy.

After the press is completely closed and the closing pressure has been built up, the heating medium is introduced into the bladder. On the one hand, the tire shaping is then carried out at high pressure on the outside of the tire and on the other hand, a smoothing and evening out of all the internal tire components and thickenings is also carried out at high pressure. Small residual quantities of air are thus removed via the bladder grooves and air removal bores in the bead rings 6, 6'.

After the vulcanization and the emptying of the inside, the condensate or residual water disposed in the bladder is drained into the evacuation network by the bladder being moved into the rest position.

The measures which permit a bladderless vulcanization of tires in an electrically driven auto-molding press, according to the present invention, will now be explained in detail in conjunction with FIGS. 4 to 7. Only those structural details which diverge from the representations according to FIGS. 1 to 3 are described and components that have not changed in relation to these Figures. are labeled with the same reference numerals as in FIGS. 1 to 3. However, structurally altered components and new components have been given new reference numerals.

Figure 4:
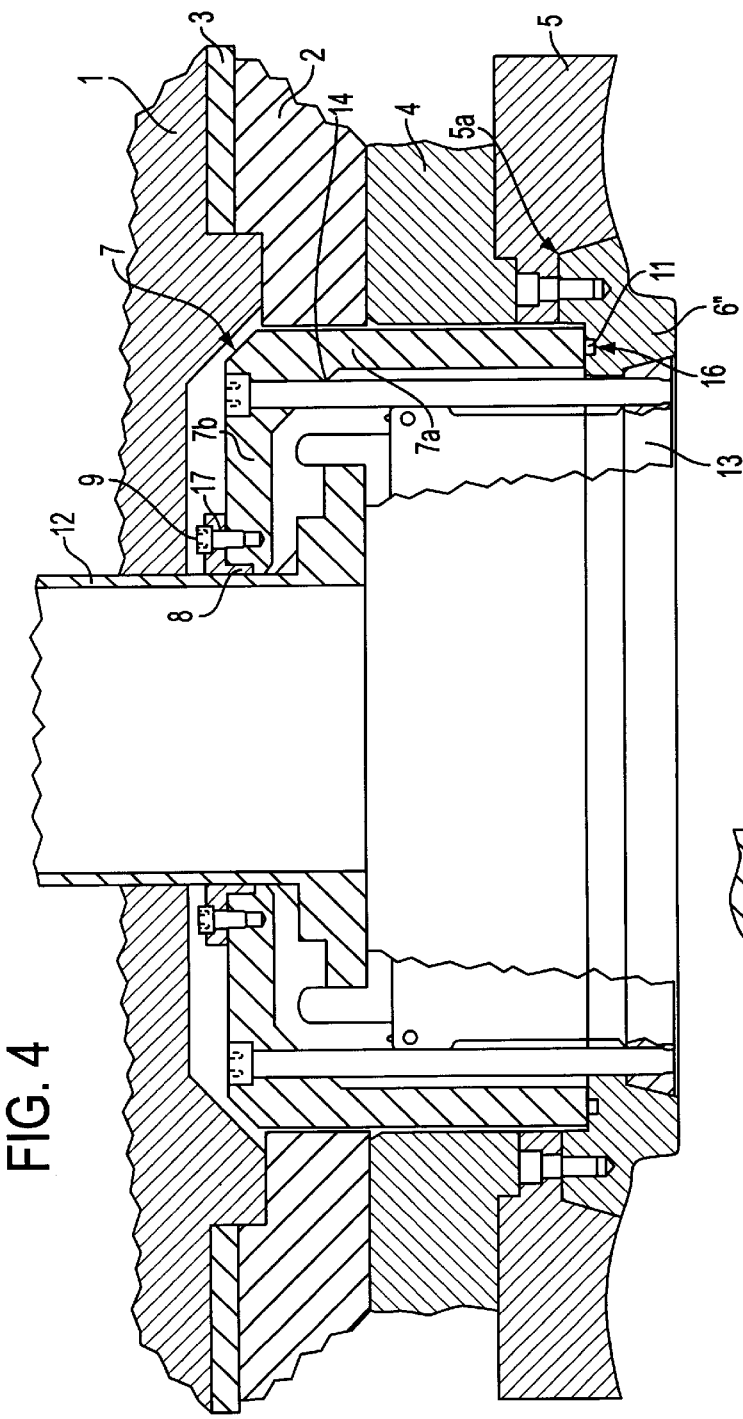
FIGS. 4 to 7 are sectional representations that cut through parts of a first exemplary embodiment of the invention.

As shown in FIG. 4, a connection between the side shell 5 and the bead ring 6" is not provided in the curing press embodied according to the invention. Furthermore, the bead ring 6" is embodied without air removal bores, which are provided in conventional systems in the bead toe region.

Figure 4A:
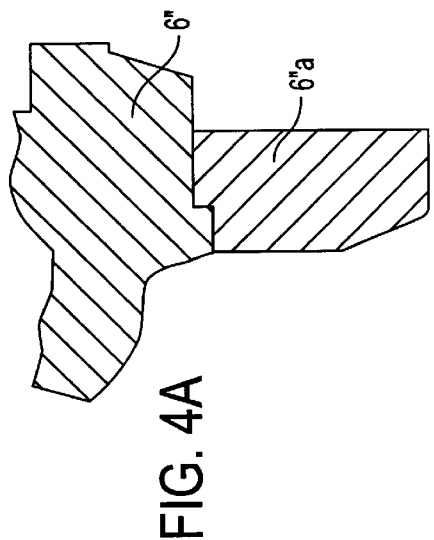
FIG. 4a shows a detail from FIG. 4 in a modified embodiment.

As shown in FIG. 4a, the bead ring 6" can be equipped with a centering part 6"a that sits on the bead ring and is continuously annular. The centering part 6"a can be embodied as a separate component which is screwed to the bead ring 6", or can also be embodied as being integral with the bead ring 6". A conical beveling permits a frictionless raising of the tire to be vulcanized. With tires that are introduced into the press as green tires, the centering part 6"a has the advantage of preventing a possible sticking to the bead ring toes.

A centering part of this kind is advantageously also provided on the second bead ring. Furthermore, it is a fact that in all embodiments of the present invention, the bead rings can be equipped with centering parts of this kind.

A collared cylinder 7 disposed between the ejection tube 12 and the upper bead ring 6" forms a seal between these two components. The collared cylinder 7 is comprised of a cylindrical part 7a, which is connected to the inside of the side shell 5, the container plate 4, and the heating plate 2, and an annular part 7b, which extends from the cylindrical part 7a to the ejection tube 12. The seal between the ejection tube 12 and annular part 7b is carried out by means of an O-ring seal 8, which is held between a continuous, annular nose 17 of the annular part 7b and a flange 9 attached to the annular part 7b by means of screws. The free, bottom end of the cylindrical part 7a of the collared cylinder 7 rests on a continuous, annular recess 16 in the bead ring 6", which likewise contains an O-ring seal 11. The bead ring 6" is connected to the collared cylinder 7 and the cloverleaf mechanism 13 indicated, which is carried out via locking screws 14 in the exemplary embodiment shown. The bead ring 6" can therefore be moved up and down in concert with the collared cylinder 7, the cloverleaf mechanism 13, and the ejection tube 12, by means of the actuation cylinder, not shown.

Figure 5:
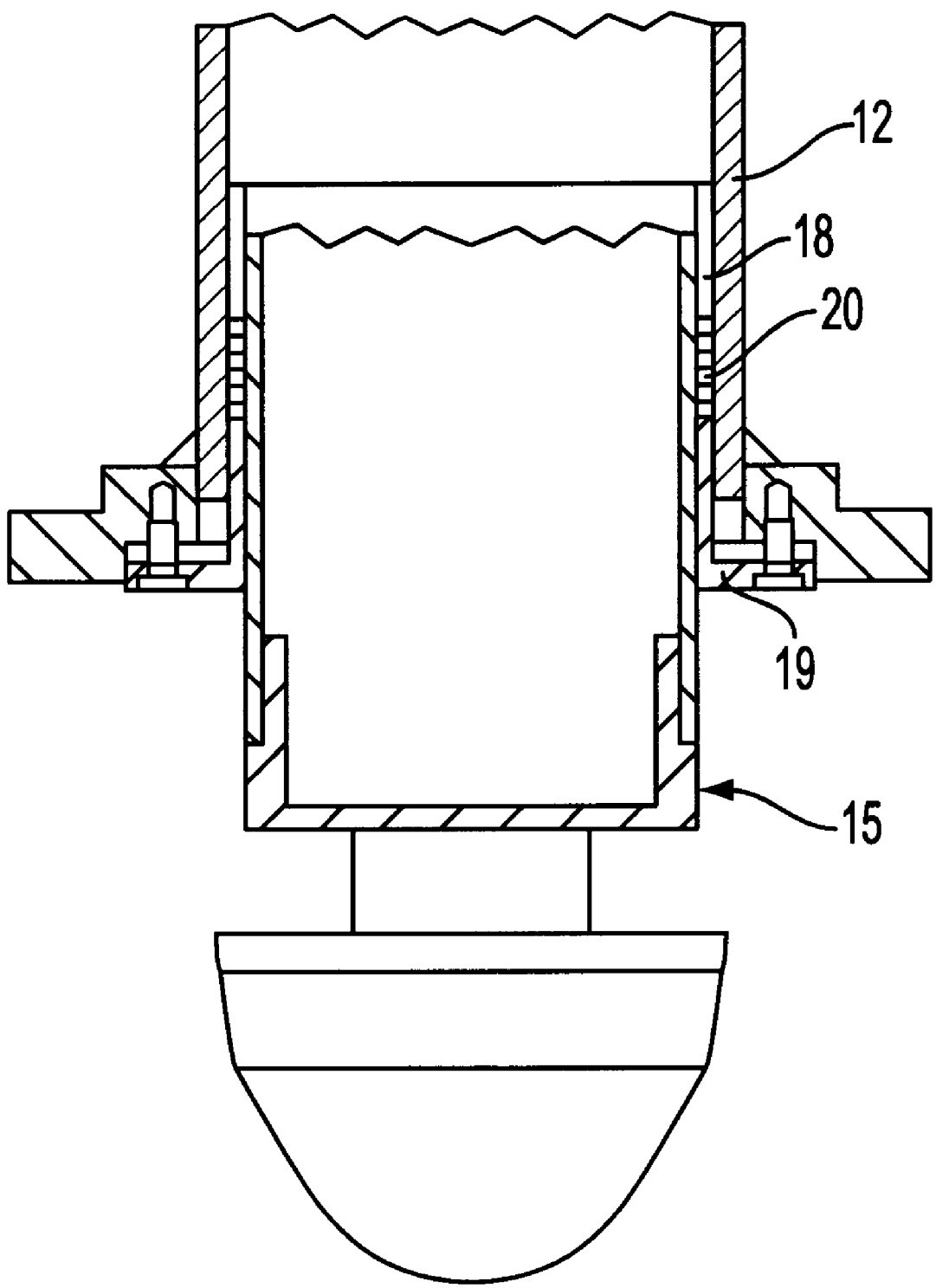

FIG. 5 shows one possibility for the sealing of the ramming cylinder in relation to the ejection tube 12. The ramming cylinder 15, which can move in relation to the ejection tube 12, is embodied in a known manner, but only has to fulfill the function of cloverleaf actuation; in curing presses according to the prior art, it also fulfills the function of centering the bladder and indenting the bladder. A cylindrical sleeve, in particular a bronze sleeve 18, is slid in between the ejection tube 12 and the ramming cylinder 15; a gland 19, which is attached to the ejection tube 12 and protrudes with a cylindrical part likewise between the ejection tube 12 and the ramming cylinder 15, presses a sealing pack 20 against the sleeve 18.

Figure 6:
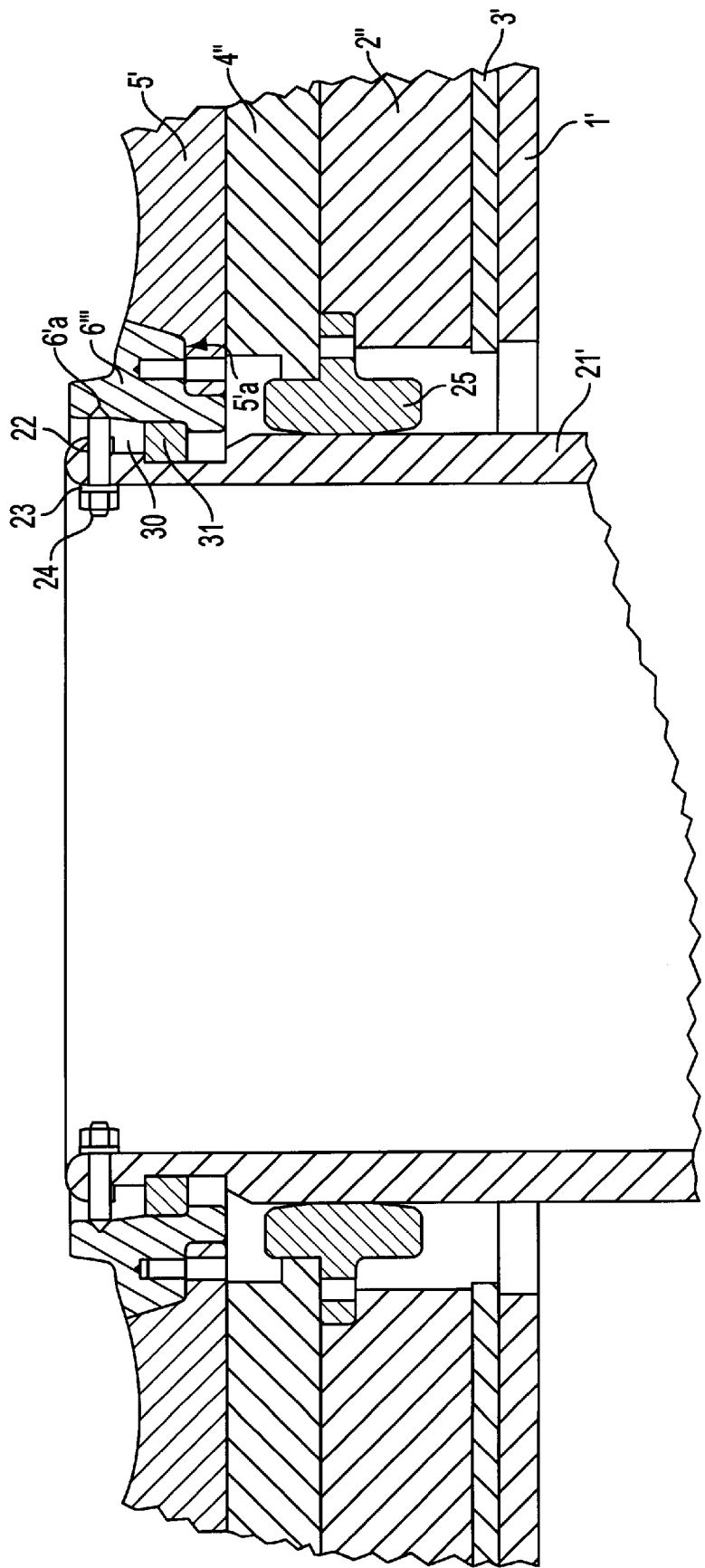

FIG. 6 shows the components of the lower part of the curing press that are significant for the explanation of the present invention, which lower part, as in a conventional curing press, is comprised of a cylindrically embodied well 21' that is closed on the bottom and is provided in a known manner with inflow and outflow openings for the heating medium, a press table plate 1', a lower heating plate 2", an insulation plate 3', a lower part 4" of the container, as well as the parts belonging to the segment mold, wherein a lower side shell 5' and a lower bead ring 6'" are shown here. The bead ring 6'", as is common in conventional devices, is not connected to the lower side shell 5', but is fastened to the well 21'. For this purpose, the lower bead ring 6'" is provided with a groove 6'a, for example in its region oriented toward the well 21', which groove is engaged by threaded pins 22 that pass through the well 21' and are held by means of a nut 24 and a spacer disk 23.

A centering ring 25 disposed on the heating plate 2" assures a vertical guidance of the well 21'.

The seal in relation to the outside is produced via an annular seal 30, which can be the cut-off base of a bladder and is seated beneath the threaded pins 22 in a recess disposed on the outside of the well 21' and is held by means of a clamping ring 31. The clamping ring 31 is supported both on a shoulder of the bead ring 6'" and on a shoulder in the well 21'.

The lower bead ring 6'" can consequently be moved vertically in concert with the well 21', wherein this vertical movement is produced by the well actuation cylinder, not shown.

Also, the lower bead ring 6'" is embodied without air removal bores and air removal ribs in the toe region.

To carry out the curing process according to the invention, a suitable loader places the raw tire on the telescoped lower bead ring 6'" (vertically raised together with the well 21'). As a result, the raw tire side wall adjacent to this bead ring 6'" is prevented from experiencing undesired thermal strain due to the hot side shell. With raw tires or vulcanized tire casings produced according to a one-step process, a centering of the tire with a lowered bead ring 6'" would additionally not be possible since tires or tire casings of this kind would not rest on the bead ring because they are prevented from doing so by the lower side wall of the mold.

The closing process of the curing press is carried out with a simultaneous movement toward each other or nearing of the bead rings 6", 6'" so that the raw tire beads are forced to press on the bead rings 6", 6'". The closing movement of the curing press is stopped as soon as the two bead rings 6", 6' have come close enough to each other or when the two bead rings 6", 6'" touch. The bead rings 6", 6'" are close enough to each other if the inherent rigidity of the raw tire assures a bead spacing at which a sealing of the tire against the bead rings 6", 6'" is assured by the subsequent action of hot vapor on the inner chamber of the tire and the press. In tires that have low inherent rigidity, the two bead rings 6", 6'" approach each other until they touch. In this phase, therefore, the so-called tensing vapor fill occurs, in which hot vapor is introduced into the inner chamber of the curing press, wherein an overpressure of 0.4 to 1.8 bar, preferably 0.8 to 1.5 bar is produced. The vapor tenses the tire, by means of which the seal of the tire against the bead rings 6", 6'" is produced. At approx. 0.8 bar of overpressure, the lower bead ring 6'" is pressed by the internal pressure into the pan 5'a of the side shell 5', wherein an overflow valve in the (pneumatic) lifting mechanism of the well actuation device prevents overloads. As a result of a lowering impetus on the well actuation cylinder, the bead ring 6" is assured of resting sufficiently in the pan 5'a of the side shell 5'.

Figure 7:
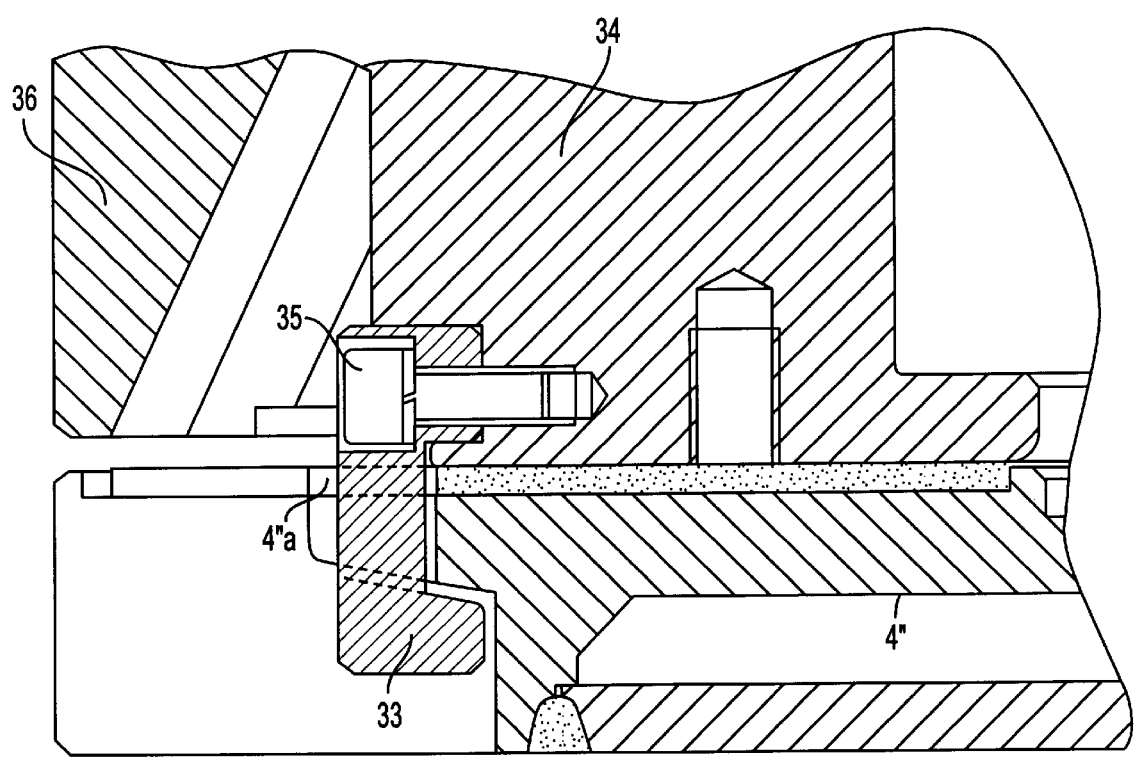

Then, a lifting impetus is initiated for the upper bead ring 6". At the same time, the container is closed in a manner that is known per se, wherein the container segments are moved radially in concert with the mold segments fastened to them, which imprint the tread profile. The bead ring 6" touches the side wall pan 5a only when segment hooks have moved into grooves 4'a provided on the lower container plate 4". FIG. 7 shows the embodiment that pertains to this in detail. The segment hooks 33 are attached to the container segments 34 by means of screws 35. The segment hooks 33 prevent the container segments 34 from lifting up from the container plates 4, 4" (as a result of the internal pressure in the tire) and thereby prevent a de-centering of the tire. When the press is opened, the container closing ring 36 moves upward and the segments 34 are held down by the segment hooks 33 during the first part of the radial movement.

Before the closing pressure is built up, the bead ring 6" rests sufficiently in the pan 5a of the side shell 5.

As in conventional curing presses, the build-up of closing pressure also follows the ensuing introduction of heating medium into the raw tire. Vapor, hot water, or inert gas can be used as the heating medium. The heating medium is put under a pressure of approximately 16 to 25 bar and exerts a uniform pressure in all directions on the inside of the tire. Consequently, no smoothing and evening out of the inner tire components occur and also no thickenings and no undesirable transport of air occur.

As a result of the bladderless vulcanization according to the invention, the interior of the finished tire essentially has the visual appearance of a raw tire. The outer appearance of the finished tire corresponds to that of a conventional tire down to the range of a few millimeters before the bead toes, which are formed with rounded bead toe tips.

The condensate or residual water disposed in the finished tire after the vulcanization and the emptying of the inside can be drained into the evacuation network with the aid of a vapor stream, which is introduced into the interior via nozzles charged from the well. Also, a draining of the condensate can be carried out by means of the internal pressure during the curing cycle.

Upon removal from the mold, the tire is separated from the side shells 5, 5' by the lowering of the upper bead ring 6". As described above, the separation from the tread profile is initiated during the opening process via the segment hooks 33.

In an alternative embodiment of the invention, it is provided that only the lower bead ring 6''' can be moved separately from the side shell 5', wherein the upper bead ring 6" is connected to the upper side shell 5, in particular by means of screws. In this alternative, therefore, in the first phase of closing, the upper bead ring 6", along with the side shell, is already pressed into its end position and only the lower bead ring 6''' is lifted to such degree that the above-described recoiling force of the tire is assured. In this instance, the mold actuation can be carried out via the ejection tube and separate segment hooks 33 can be eliminated since the actuation of the container is carried out in the usual manner.

Figure 8:
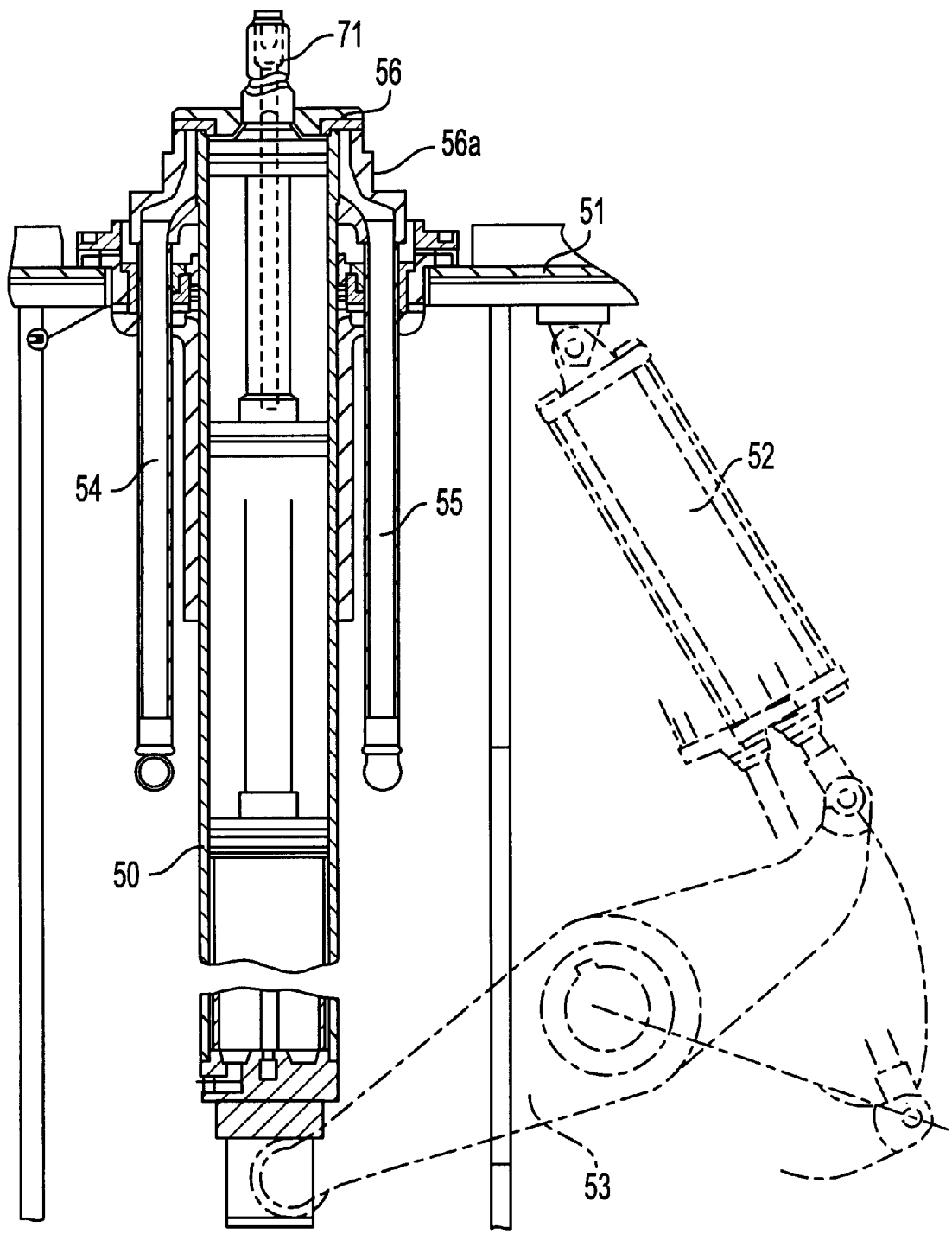
FIGS. 8 and 9 are sections through essential parts of an electrically driven BOM curing press according to the prior art.
Figure 9:
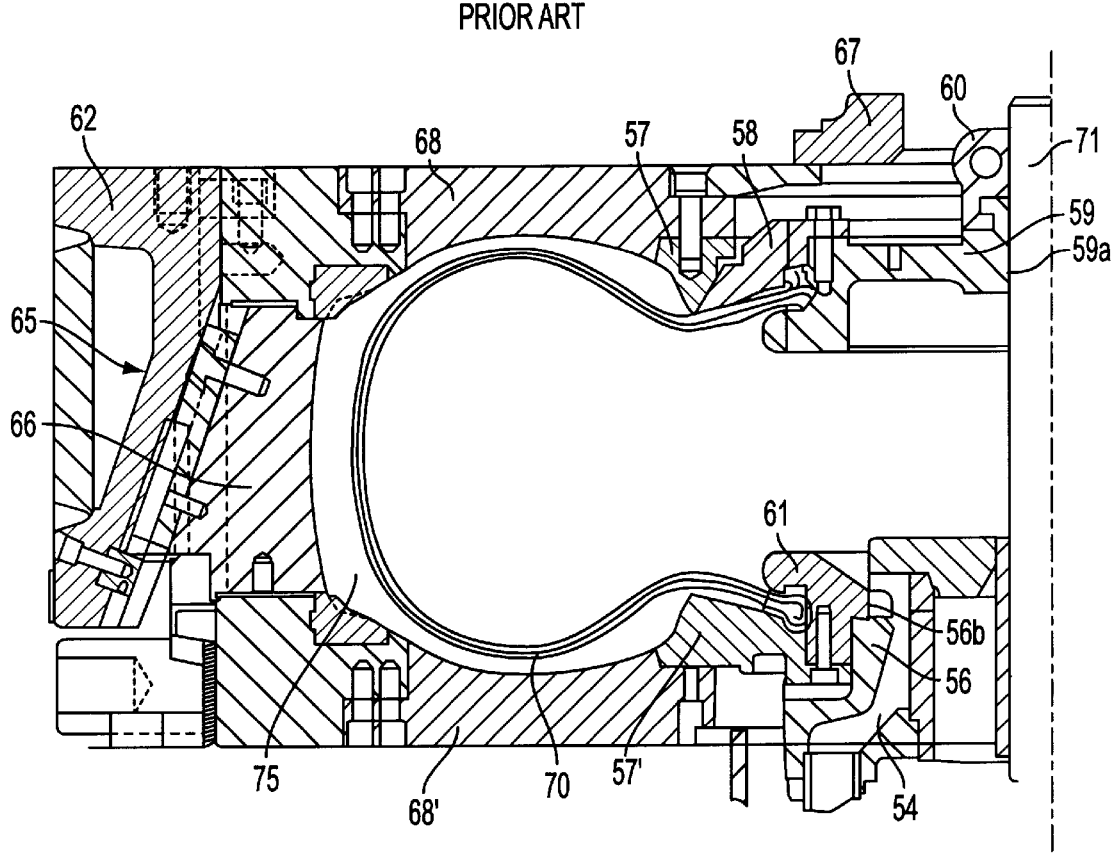
Figure 10:
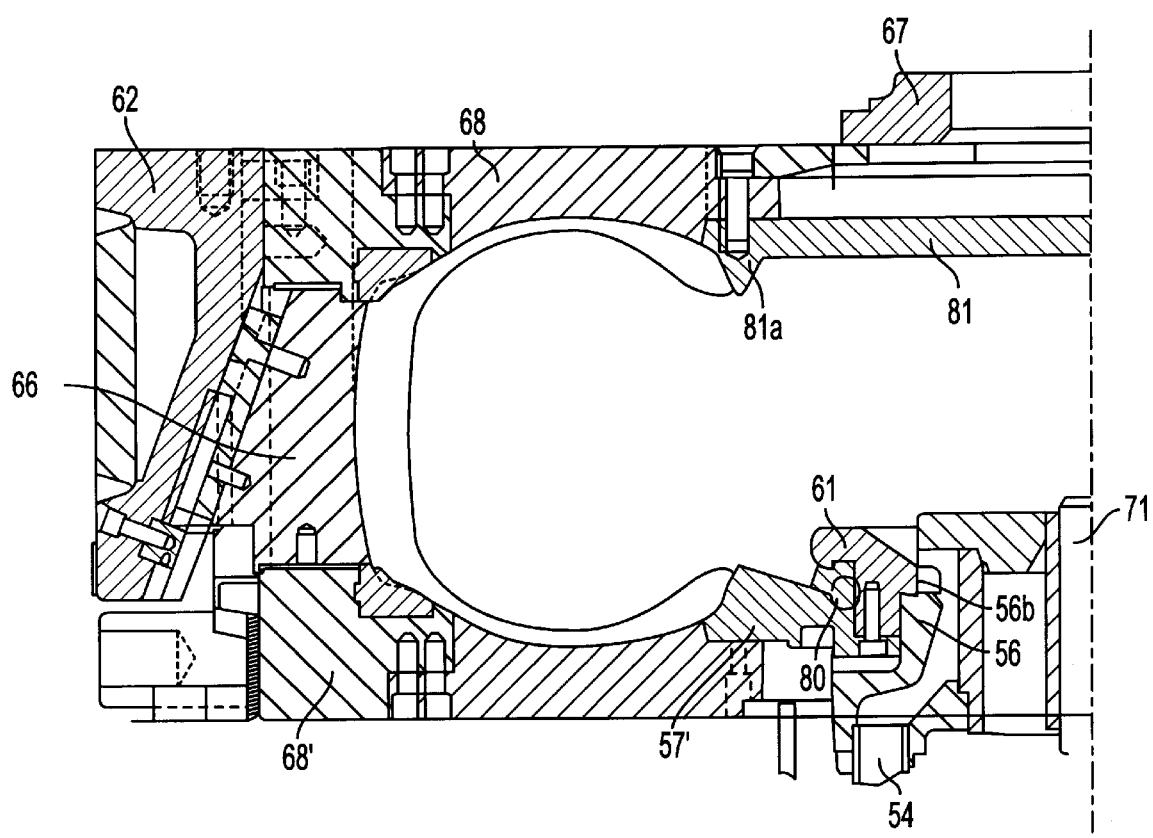
FIG. 10 is a sectional representation that cuts through the curing press adapted according to the invention in a drawing analogous to FIG. 9.

Another exemplary embodiment is described in conjunction with FIGS. 8 to 10. FIGS. 8 and 9 show sections through essential parts of an electrically operated BOM curing press from the prior art, FIG. 8 shows the central mechanism and FIG. 9 shows the bladder clamp and the curing mold. A BOM press has a bladder that is clamped on both sides and upper and lower bladder clamping rings that can be raised and lowered.

As shown in FIG. 8, the central mechanism includes a double-action cylinder 50, which is fastened to the press table 51 and can be moved up and down together with the supply and discharge lines 54, 55 for the heating medium via an actuation cylinder 52 and a lever 53. The cylinder 50 has a cylinder cover 56, which is provided with a thread 56a, to which the lower bladder clamping ring is attached, as will be described further in conjunction with FIG. 9. The upper bladder clamping rings are attached to the piston rod 71, which is likewise described in more detail below.

FIG. 9 shows the disposition of the lower bladder clamp 61 on the cylinder cover 56. The lower bladder clamp ring 61 is screwed to the cylinder cover 56 and sealed in relation to the outside by means of O-ring seals 56b. The bladder 70 is clamped on the one end between the lower bead ring 57' and the lower bladder clamping ring 61 and on the other end, between the two upper bladder clamping rings 58, 59 attached to the piston rod 71. The bladder clamping ring 59 is attached to the piston rod 71 via a clamp connection 60 and likewise sealed in relation to the outside by means of an O-ring seal 59a. The bladder clamping ring 58 is screwed to the clamping ring 59.

In FIG. 9, other parts of the mold can be seen, in particular a mold closing ring 62, a conventional actuation mechanism 65 for moving mold segments in and out, one of the mold segments 66 that shapes the profile, an upper side shell 68, and a lower side shell 68'. A lower bead ring 57' is connected to the bladder clamp (lower bladder clamping ring 61). An upper bead ring 57 is screwed to the upper side shell 68. Consequently, the upper bladder clamp (bladder clamping rings 58, 59 together with the piston rod 71) and the upper bead ring 57 can be moved separately from each other. For the purpose of loading the raw tire, the mold is opened, i.e. the upper press parts are lifted or pivoted away. An actuation die 67 presses the upper side shell 68 downward in relation to the mold closing ring 62 attached to the upper part of the press, and the mold segments 66 are moved radially outward.

The bladder 70 is stretched via an upward movement of the piston rod 71, and is sucked against the piston rod 71 through the exertion of a vacuum. The lower bead ring 57' is moved downward into the lower side shell 68' (position as in FIG. 9).

A corresponding loading device lowers the raw tire over the stretched bladder 70 down to the level of the lower bead ring 57'. Tensing vapor is introduced via vapor supply line 54; at the same time, the upper bladder clamp (bladder clamping rings 58, 59 together with the piston rod 71) is lowered and consequently the bladder is introduced into tire 75. After the tensing vapor holding pressure is achieved in the bladder, the tire is released from the loading device and the press is closed in a known manner.

With regard to FIG. 10, the measures or the structural alterations in relation to FIG. 9 will now be explained so that a bladderless vulcanization is possible using this type of curing press. The components that have not been altered are labeled with the same reference numerals as in FIG. 9, structurally altered components have been given new reference numerals.

To seal the system in the lower region of the press, a seal 80, in particular a rubber seal that can be the cut-off base of a bladder, is clamped between the lower bladder clamping ring 61, which now no longer fulfills this function, and the lower bead ring 57.

To seal the system in the upper part of the press, there is now a bead ring plate 81 that is provided with the bead ring 81a and is screwed to the upper side shell 68. The piston rod 71 of the central mechanism, which can furthermore remain as shown in FIG. 8, is no longer necessary and remains lowered in its bottom position.

In this exemplary embodiment as well, both bead rings 57', 81a are free of air removal bores in the toe region.

As before, the lower bead ring 57' is still attached via a thread to the cover 56 of the central mechanism (see FIG. 8) by means of the lower clamping ring 61 and is sealed in relation to the outside by the O-rings 56b. The lower bead ring 57' can consequently be moved up and down via the central mechanism.

When the press is open (upper press parts are moved away or pivoted upward with the bead ring plate 81) and mold is open, a suitable loading device, which can correspond to the prior art, places the raw tire with its lower bead positioned centrally and plane-parallel on the lower bead ring 57', which has been previously raised. The bead ring plate 81 screwed into the upper side shell 68 is pressed downward in relation to the mold closing ring 62 attached in the upper part of the press. The mold segments 66 are moved radially outward. The press is now closed to such a degree that the bead ring plate 81 reaches its lowest point and consequently its end position. This is the case when the mold segments 66 touch the lower side shell 68'.

In this first phase of closing, it is assured that the two bead rings 81a and 57' have gotten so close that the recoiling force produced by the inherent rigidity of the raw tire is sufficient to assure the seal between the tire beads and the bead rings in the ensuing closing phase. The above-mentioned raised position of the lower bead ring 57' must therefore be correspondingly adjusted.

When this press-stop position is reached, a tensing vapor, which is regulated to 0.4 to 1.8 bar, in particular 0.8 to 1.5 bar, is introduced via the vapor supply line 54. This initially presses the raw tire beads in a vapor-tight manner against the two bead rings 81a and 57' and as a result, moves the lower bead ring 57' downward until it touches the lower side shell 68'.

In order to assure a trouble-free execution of the bead ring movement, the lowering force, which acts in a downward direction as a result of the internal pressure, is chosen as slightly higher than the lifting force exerted via the central mechanism. This can be carried out in particular by means of a controllable overflow valve built into the actuation cylinder of the central mechanism.

As soon as the bead ring 57' touches the side shell 68', the bead ring 57' is pulled downward via the movement cylinder of the central mechanism, which prevents overflows between the bead ring 57' and the lower side shell 68' in the event of later-acting high internal pressure.

During the continued press closing process, the mold segments are moved radially inward by the closing ring and thus completely close the mold. After the build-up of closing pressure, the heating medium is introduced. Once the pressure vulcanization has been carried out, the heating medium is discharged and the tire is removed from the mold.

Also in this embodiment, the condensate or residual water disposed in the finished tire after vulcanization is correspondingly removed, which can occur, as described in the first exemplary embodiment, with the aid of a vapor stream brought in via the inflow openings in the cylinder cover or can also occur by means of vacuum.

The present invention basically makes use of the knowledge that the tire can seal itself against the bead rings. The movement of the bead ring, press, and segments is therefore controlled in tune with the changes in pressure so that the tire beads seal against the bead rings. No thermal or mechanical overloading of the tire side walls and the casings are produced, and the upper side wall of the mold is not raised. How the control should be carried out is predetermined for each tire dimension and is input into the automatically running control process. In the field of tire vulcanization, this can be carried out by one skilled in the art. The temperature guidance of the heating medium and the temperature load capacity of the tire components should be correspondingly tuned to one another.

The process according to the invention and the curing presses according to the invention are not only suited for vulcanizing new tires or raw tires, but can also be used in reconditioning or with partially vulcanized tires. The process according to the invention for bladderless vulcanization can be used for vulcanizing passenger and truck tires and also for radial and bias-type tires.

It should also be mentioned that the term partially vulcanized tires is particularly understood to mean tires of the type that are produced or constructed in accordance with the process disclosed by EP-A 0 729 825. The tire construction is divided into two parts in this process, in which first a partial tire, for example except for the tread, is constructed and vulcanized. At a later point, this partial tire is made into a complete tire, possibly through the construction of the raw tread, and is vulcanized again. Both the partial tire produced in the first part of the process and the tire completed in the second part of the process can be vulcanized in accordance with the process according to the invention and in a curing press according to the invention.

It is noted that the foregoing examples have been provided merely for the purpose of explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed is:

1. A process for vulcanizing at least one of tires and partial tires, in an automatically actuatable curing press, which has a vulcanization mold comprised of two or more parts that can be opened and closed and has one upper bead ring and one lower bead ring for positioning and shaping tire beads, which bead rings can be moved via actuation mechanisms in an axial direction with regard to a tire position in the curing press, wherein the curing press and the tire to be vulcanized form a press/tire system which is sealed inside of the bead rings by the curing press and is sealed outside of the bead rings by the tire to be vulcanized, the process comprising:

positioning a tire to be vulcanized on the lower bead ring of the curing press through use of a loading device;

closing the curing press in a first phase such that the lower bead ring and the upper bead ring of the curing press approach each other until inherent rigidity of the tire to be vulcanized exerts a recoiling force on the bead rings, such that the tire beads seal the inner chamber formed by the press/tire system;

introducing tensing vapor during a stop-position of the upper and lower bead rings into the sealed inner chamber formed by the press/tire system, which vapor presses tire beads of the tire to be vulcanized in a vapor-tight manner against the two bead rings; and positioning the bead rings in an end position by completing closing of the curing press.

2. The process of claim 1, further comprising bringing the lower bead into a raised position before positioning the tire to be vulcanized.

3. The process according to claim 1, wherein the tensing vapor is regulated such that a downward acting force on the lower bead ring is slightly greater than a lifting force exerted by an actuating mechanism of the lower bead ring so that the lower bead ring reaches its end position in a lower side shell of the curing press.

4. The process of claim 1, wherein the tensing vapor is introduced at an overpressure of 0.4 to 1.8 bar.

5. The process of claim 4, wherein the tensing vapor is introduced at an overpressure of 0.8 to 1.5 bar.

6. The process of claim 1, wherein closing the curing press in the first phase comprises moving the two bead rings to reciprocally approach each other.

7. The process of claim 6, further comprising moving the upper bead ring independently of a side shell of the press.

8. The process of claim 1, wherein segment hooks, which are attached to container segments of the press, engage in a lower container plate in order to stabilize an upper side shell of the press during closing and opening.

9. The process of claim 1, wherein lowering of the lower bead ring is carried out by controllable overflow valves.

10. The process of claim 1, wherein lowering of the upper bead ring is carried out by controllable overflow valves.

11. The process of claim 1, further comprising closing mold segments by an actuation mechanism.

12. The process of claim 1, further comprising closing side shells of the curing press by an actuation mechanism, and further comprising introducing heating medium into the tire to be vulcanized.

13. The process of claim 12, wherein temperature control of the heating medium and a temperature load capacity of components of the tire to be vulcanized are tuned to each other.

14. The process of claim 1, further comprising removing residual water from an inner chamber of the tire after curing by introducing into the sealed inner chamber one of a vapor stream and an air stream.

15. The process of claim 14, wherein the one of a vapor stream and an air stream are introduced into the inner chamber of the tire by use of a vacuum.

16. The process of claim 1, further comprising continuously discharging condensate by use of internal pressure during curing.

17. The process of claim 1, further comprising moving mold segments of the vulcanization mold radially outward during opening of the vulcanization mold.

18. The process of claim 1, further comprising moving mold segments of the vulcanization mold radially inward during closing of the vulcanization mold.

19. The process of claim 1, further comprising vulcanizing the tire when the bead rings are positioned in the end position.

* * * * *